(12) United States Patent
Guldner et al.

(10) Patent No.: US 6,786,296 B2
(45) Date of Patent: Sep. 7, 2004

(54) BACK-DRIVABLE STEER-BY-WIRE SYSTEM WITH POSITIVE SCRUB RADIUS

(75) Inventors: Jürgen Guldner, Munich (DE);
Markus Krug, Munich (DE);
Slawomir Bakaus, Munich (DE);
Kai-Uwe Balszuweit, Grasbrunn (DE);
Hendrikus Smakman, Munich (DE);
Christian Ebner, Munich (DE);
Michael Gräf, Gräfelfing (DE); Schedl
Anton, Munich (DE); Patrick
Mescher, Bellbrook, OH (US); Robert
Disser, Dayton, OH (US); Jeffrey
Heinrichs, Dayton, OH (US); Scott
Millsap, Saginaw, MI (US); Brian
Murray, Novi, MI (US); Detlef
Krukenkamp, Unterschleissheim (DE);
Michael Byers, Ann Arbor, MI (US)

(73) Assignees: Bayerische Motoren Werke
Aktiengesellschaft, Munich (DE);
Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/157,021
(22) Filed: May 30, 2002
(65) Prior Publication Data
US 2003/0221894 A1 Dec. 4, 2003

(51) Int. Cl.[7] .............................................. B62D 5/00
(52) U.S. Cl. ...................... 180/402; 180/6.24; 180/403; 180/421; 180/422; 701/41
(58) Field of Search ............................. 180/6.24, 6.28, 180/402–407, 421, 422; 701/41, 42, 43

(56) References Cited

U.S. PATENT DOCUMENTS

| 4,754,829 | A | | 7/1988 | Shimizu | 180/79.1 |
|---|---|---|---|---|---|
| 4,865,144 | A | * | 9/1989 | North | 180/402 |
| 5,275,250 | A | * | 1/1994 | Muller et al. | 180/402 |
| 5,717,590 | A | * | 2/1998 | Mihalko | 701/41 |
| 6,076,626 | A | * | 6/2000 | Bohner et al. | 180/402 |
| 6,209,677 | B1 | * | 4/2001 | Bohner et al. | 180/406 |
| 6,213,246 | B1 | * | 4/2001 | Bohner et al. | 180/403 |
| 6,279,674 | B1 | * | 8/2001 | Lissel et al. | 180/402 |
| 6,279,675 | B1 | * | 8/2001 | Bohner et al. | 180/403 |
| 6,370,460 | B1 | * | 4/2002 | Kaufmann et al. | 701/41 |
| 6,519,518 | B1 | * | 2/2003 | Klein et al. | 701/41 |
| 2001/0032762 | A1 | | 10/2001 | Weisgerber | 188/266 |

FOREIGN PATENT DOCUMENTS

EP 0999117 5/2000

* cited by examiner

Primary Examiner—Lesley D. Morris
Assistant Examiner—L. Lum
(74) Attorney, Agent, or Firm—Crowell & Moring LLP

(57) ABSTRACT

In an embodiment of the present invention, an apparatus for steering a vehicle is disclosed. The apparatus includes a back-drivable steer-by-wire system including a road wheel actuator assembly coupled to a wheel of the vehicle. The road wheel actuator assembly defines a steering axis and the steering axis is off-set from a longitudinal axis of the wheel by a positive scrub radius. In an embodiment for a method in accordance with the present invention, a method to steer a vehicle after failure of a road wheel actuator assembly in a back-drivable steer-by-wire steering system is disclosed. The method includes the acts of applying a braking force to the wheel and generating a torque on the road wheel actuator assembly by the applied braking force acting through a positive scrub radius.

24 Claims, 9 Drawing Sheets

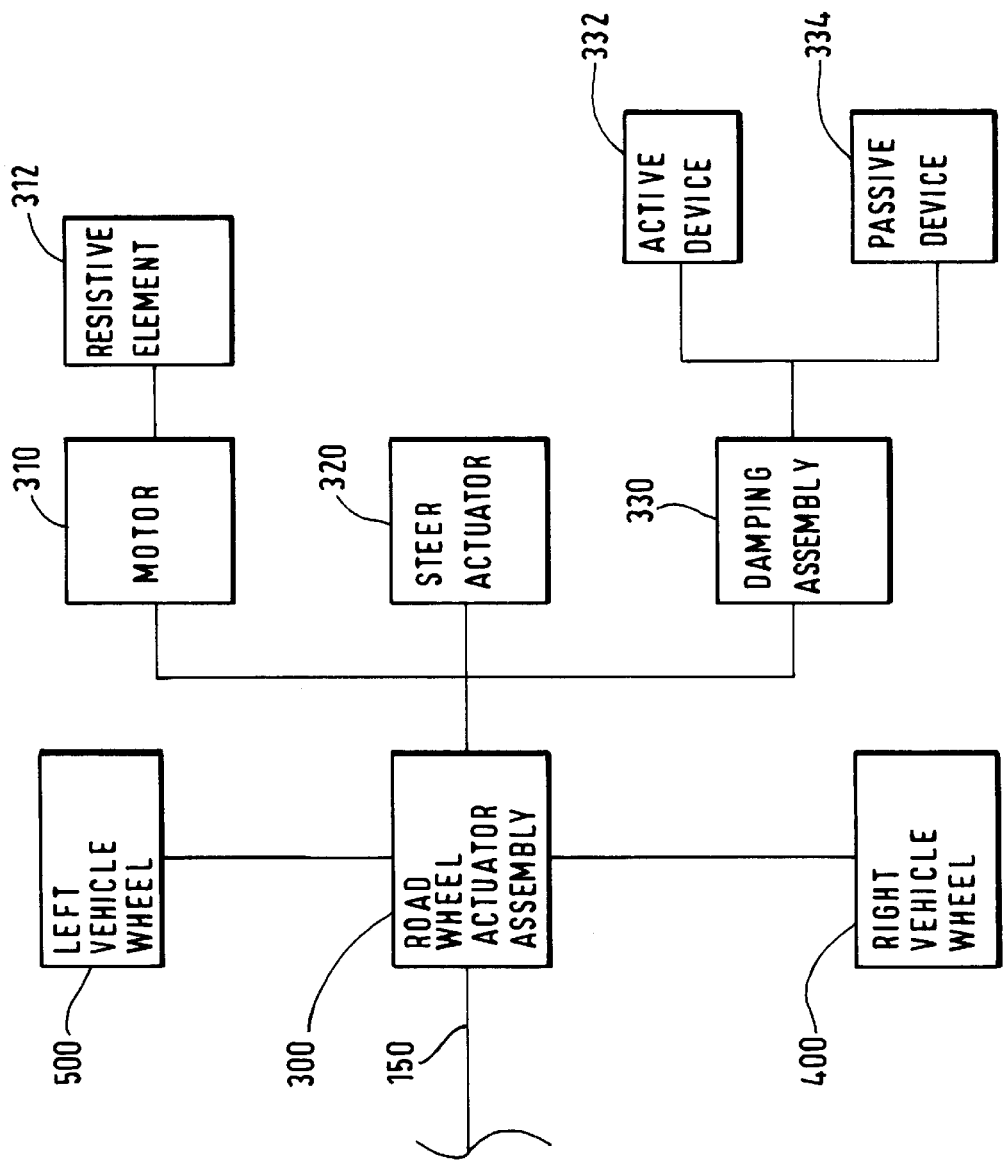

BACK-DRIVABLE STEER-BY-WIRE SYSTEM WITH POSITIVE SCRUB RADIUS

BACKGROUND OF THE INVENTION

Current steering systems for road vehicles possess a mechanical link between the vehicle steering wheel, or hand wheel actuator, and the steered road wheels of the vehicle. Future steering systems may replace the mechanical link by an electro-hydraulic link or a mechanical-electronic link. These future systems, which do not use the mechanical link, may be generally referred to as steer-by-wire systems. In a steer-by-wire system, some mechanism is provided to steer the road wheels. Steering of the road wheels in a steer-by-wire system can be accomplished with appropriate electric motors and power electronics. Multiple motors at the road wheels provide a level of redundancy to maintain the capability to steer when a failure occurs in a single motor. However, a disadvantage with such systems is that when all of the electric motors at the road wheels fail, then the steering function can no longer be performed by the steer-by-wire system. Additionally, since a conventional mechanical link is not provided in a steer-by-wire system, steering cannot be accomplished through a mechanical link.

An approach for attempting to solve the problem of loss of steering control due to the failure of the steer-by-wire system is to use the braking actuators to apply appropriate forces on the vehicle to steer the vehicle. This approach is illustrated in FIG. 1. As can be seen, a vehicle 1 is shown in a first orientation 1A traveling in a straight direction of travel 10. The center of gravity of the vehicle is shown by reference numeral 2. In the situation where the steer-by-wire system of the vehicle fails, as mentioned above, and the driver of the vehicle desires to turn the vehicle to the right to orientation 1B, for example, the driver can steer the vehicle by using the brakes. A brake force 3 is applied to right wheel 4 of the vehicle. The brake force 3 acts on the right wheel 4 on the longitudinal axis 5 of the wheel 4 with a lever arm 6 with respect to the centerline 7 of the vehicle. As can be understood, the force 3 acting on wheel 4 through lever arm 6 generates a yaw moment 8 on the vehicle about the vehicle's center of gravity 2. The yaw moment 8 tends to rotate the vehicle 1 to the right and thus initiates a cornering motion of the vehicle to orient the vehicle in new orientation 1B. Thus, the braking force 3 applied to right wheel 4 turns the vehicle to the right.

There are disadvantages to the approach of using the brakes to steer the vehicle in a failure condition of the steer-by-wire system. For example, the cornering performance of the vehicle is limited due to the fact that the cornering forces rely solely on the longitudinal forces at the tires. Additionally, when the steering system has failed with the tires turned to a certain angle and the steering system is locked in this failed condition, the limited cornering potential that is available to the driver from use of the brakes to steer the vehicle may make it impossible to compensate completely for the locked steering system.

Therefore, it would be desirable to provide an improved apparatus and method for steering a vehicle in a failed condition for a steer-by-wire system where the driver experiences a loss of steering control due to the failure of the steer-by-wire system.

SUMMARY OF THE INVENTION

In an embodiment of the present invention, an apparatus for steering a vehicle is provided. The apparatus includes a back-drivable steer-by-wire system including a road wheel actuator assembly coupled to a wheel of the vehicle. The road wheel actuator assembly defines a steering axis and the steering axis is off-set from a longitudinal axis of the wheel by a positive scrub radius.

In an embodiment for a method in accordance with the present invention, a method to steer a vehicle after failure of a road wheel actuator assembly in a back-drivable steer-by-wire steering system is provided. The method includes the acts of applying a braking force to the wheel and generating a torque on the road wheel actuator assembly by the applied braking force acting through a positive scrub radius.

Other objects, advantages and novel features of the present invention will become apparent from the following detailed description of the invention when considered in conjunction with the accompanying drawings.

BRIEF DESCRIPTION OF THE DRAWINGS

FIG. 12 is a block diagram of an embodiment of the road wheel actuator assembly in accordance with the principles of the present invention.

DETAILED DESCRIPTION OF THE DRAWINGS

The present invention provides a steer-by-wire steering system 100 that is back-drivable in the event of a motor failure in the road wheel actuator assembly 300. In accordance with the principles of the present invention, and as mentioned above, the steer-by-wire system is back-drivable, i.e., in the event of a motor failure in the road wheel actuator assembly, the road wheel actuator assembly is able to be actuated by brake forces applied to the wheels of the vehicle in order to steer the vehicle.

Figure 1:
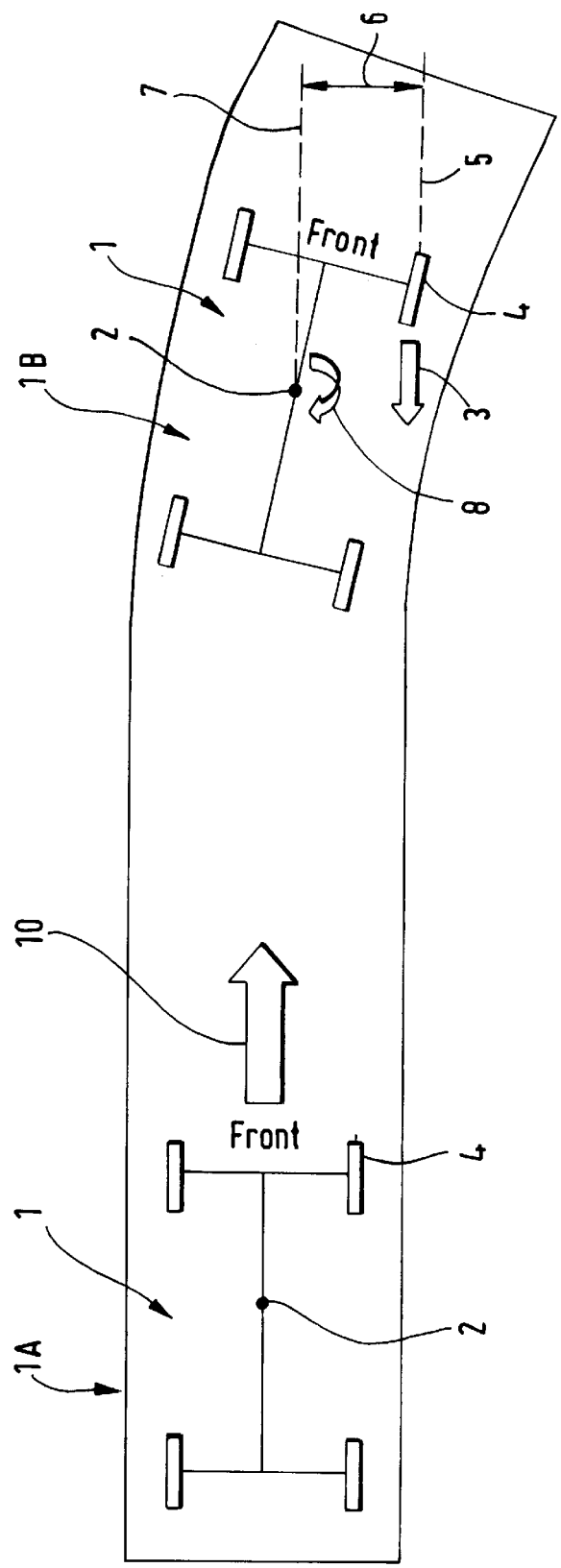
FIG. 1 is a schematic illustration of a method of steering a vehicle through use of the vehicle's brakes.
Figure 2:
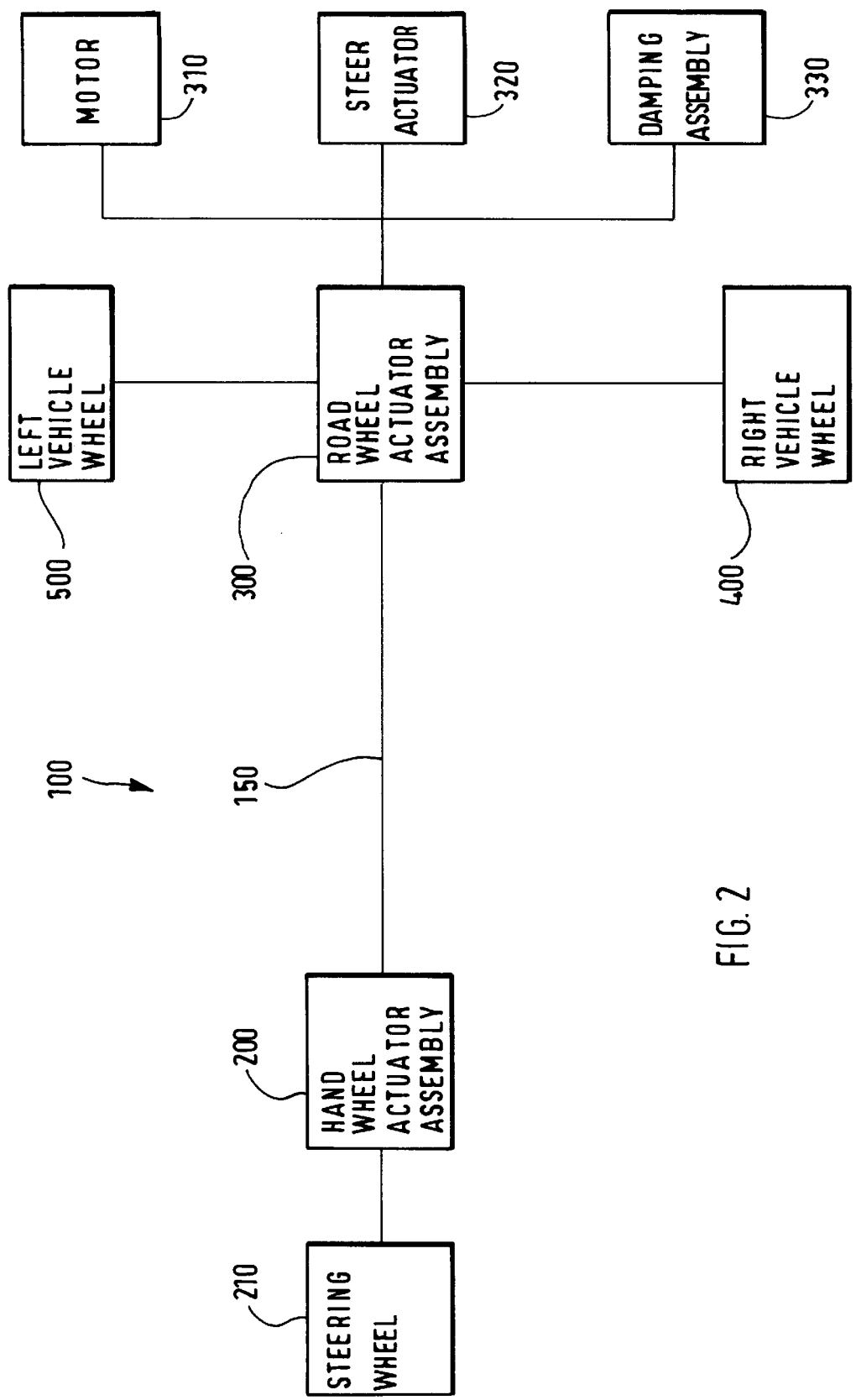
FIG. 2 is a block diagram of a steer-by-wire system in accordance with the principles of the present invention.

As can be seen in FIG. 2, the steer-by-wire system 100 includes a hand wheel actuator assembly 200, a communications link 150, and a road wheel actuator assembly 300. The road wheel actuator assembly includes a motor 310, a steer actuator 320, and a damping assembly 330. The road wheel actuator assembly will also be discussed in more detail in connection with FIGS. 3–12.

In a normal mode of operation, a steering wheel 210 coupled to the hand wheel actuator assembly 200 is used by a driver to steer the vehicle. When the driver turns the steering wheel 210, a signal is provided to the hand wheel actuator assembly 200 to indicate the degree of turn of the steering wheel, as turned by the driver. The hand wheel actuator assembly 200 sends a signal via communications path 150 to road wheel actuator assembly 300 indicative of the degree of turn of the steering wheel by the driver. The road wheel actuator assembly 300, in-turn, operates motor 310 which moves steer actuator 320 to mechanically turn the vehicle's wheels 400, 500. The steer actuator 320 is mechanically linked to the vehicle's wheels. Thus, in the normal mode of operation, motor 310 of road wheel actuator assembly 300 moves steer actuator 320 to turn the vehicle's wheels.

In a failure mode of the steer-by-wire system where motor 310 has failed, as will be further explained later in this specification, the road wheels can still be rotated by applying external forces on the road wheels. In accordance with the principles of the present invention, the longitudinal forces, which act at the tires when braking, act at a lever arm with respect to the steering axis of the axle. This lever arm is denoted as the scrub radius. Thus, the longitudinal braking force, acting through the scrub radius, generates a torque on the steering system. By incorporating a positive scrub radius, as will be further explained, the steer-by-brake performance of the vehicle is improved by the present invention.

Therefore, in the present invention, in the failure mode of operation, the steer actuator, which cannot be moved by the inoperative motor of the road wheel actuator assembly, is back-drivable by the braking force applied to the vehicle's wheels. The braking force is applied through a positive scrub radius to apply a torque to the road wheel actuator assembly. Through use of the present invention, less braking input is required at the individual wheels in order to achieve the same level of cornering performance that is available in steer-by-brake systems.

Figure 3:
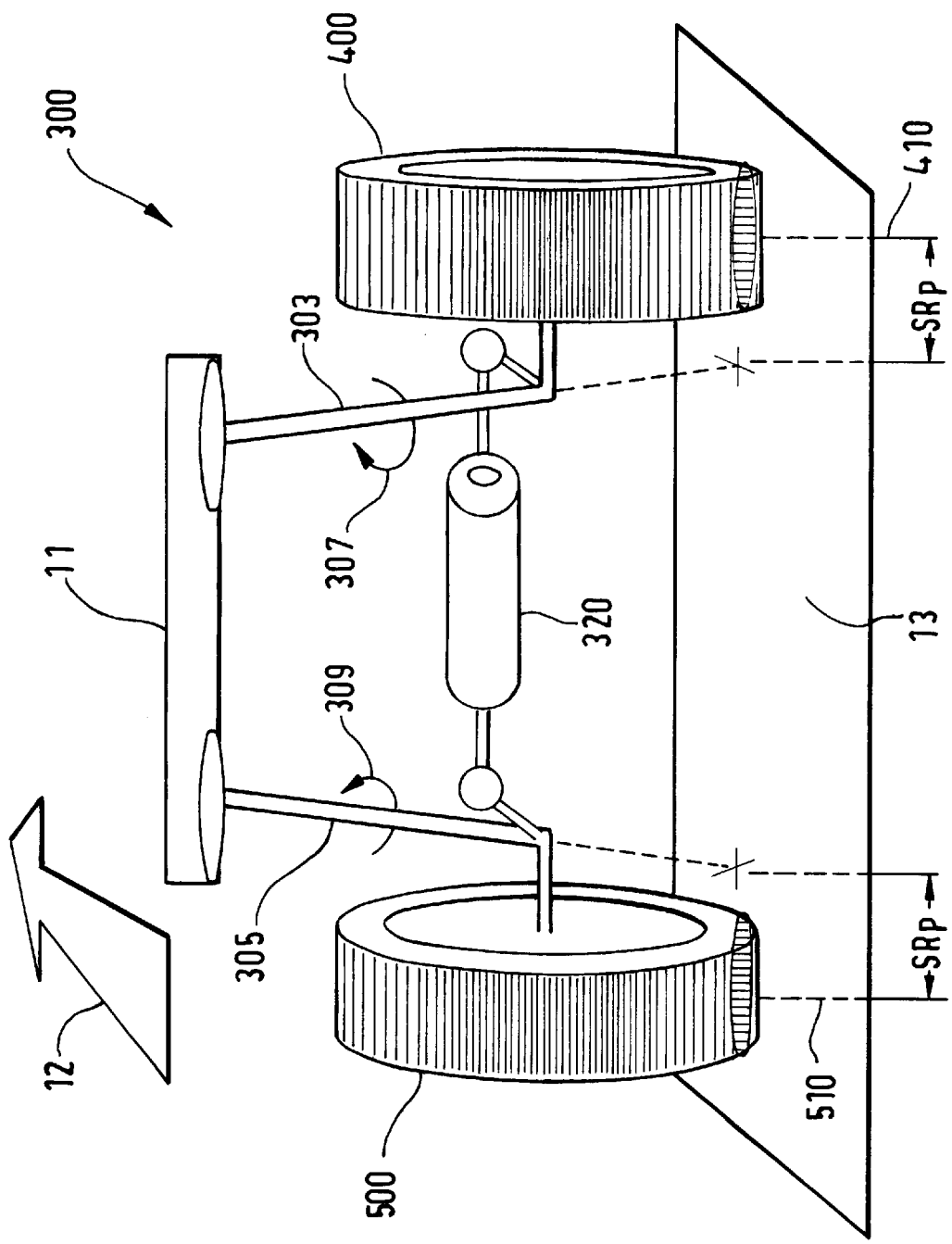
FIG. 3 is a schematic illustration of a road wheel actuator assembly with a steering axis off-set from the longitudinal axis of the wheel by a positive scrub radius.

FIG. 3 is a schematic illustration of the road wheel actuator assembly 300 with a steering axis offset from the longitudinal axis of a wheel by a positive scrub radius. As can be seen, road wheel actuator assembly 300 is associated with vehicle body 11 and right and left front wheels 400, 500, respectively, of the vehicle. Road wheel actuator assembly 300 includes steer actuator 320 which is mechanically coupled to both right wheel 400 and left wheel 500. As is known, in a normal mode of operation, steer actuator 320 is moved by the motor (not shown) of the road wheel actuator assembly 300 in order to move right wheel 400 and left wheel 500 to steer the vehicle.

As can also be seen in FIG. 3, each of the wheels of the vehicle define a longitudinal axis of the wheel. Specifically, right wheel 400 defines longitudinal axis 410 of the right wheel and left wheel 500 defines longitudinal axis 510 of the left wheel. Road wheel actuator assembly 300 defines steering axes with respect to the right and left wheels. Specifically, road wheel actuator assembly 300 defines right wheel steering axis 303 and left wheel steering axis 305.

In accordance with the principles of the present invention, as can be seen in FIG. 3, both the right wheel steering axis and the left wheel steering axis are off-set from the respective longitudinal axes of the wheels by a positive scrub radius designated as $SR_p$. Thus, right wheel steering axis 303, at a point where steering axis 303 intersects road surface 13, is off-set from the longitudinal axis 410 of the right wheel by the positive scrub radius $SR_p$. Thus, right wheel steering axis 303 intersects with road surface 13 at a point inboard of the longitudinal axis 410 of the right wheel 400. As will be further explained later in this specification, the positive scrub radius $SR_p$ acts as a lever arm for a force applied through longitudinal axis 410 of wheel 400 by the right wheel brake. The application of the braking force on the tire, which acts through the lever arm, or positive scrub radius, on the road wheel actuator assembly, applies a torque 307 on the road wheel actuator assembly which, in-turn, moves steer actuator 320 to move right wheel 400.

Similarly, road wheel actuator assembly 300 also defines left wheel steering axis 305 which intersects with road surface 13 at a position inboard of left wheel 500 to define a positive scrub radius $SR_p$ with respect to the longitudinal axis 510 of left wheel 500. As discussed previously with respect to right wheel 400, a braking force applied through the longitudinal axis 510 of left wheel 500 will act through the lever arm defined by the positive scrub radius $SR_p$ to produce a torque 309 on road wheel actuator assembly 300.

The configuration described above and illustrated in FIG. 3 for the positive scrub radius will result, as will be explained further in this specification, in right wheel 400 being turned to the right when a right braking force is applied to right wheel 400 and left wheel 500 being turned to the left when a left braking force is applied to left wheel 500. The left and right directions used in this specification are with respect to a direction of travel 12 of the vehicle.

Figure 4:
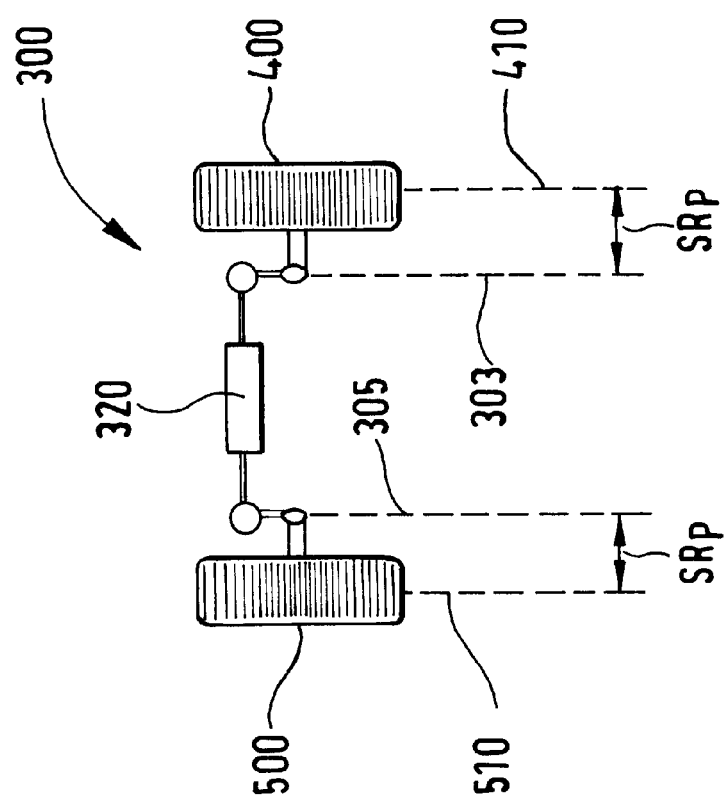
FIG. 4 is a top view of the road wheel actuator assembly of FIG. 3 with the wheels oriented in a straight direction of travel.

FIG. 4 is a top view of the road wheel actuator assembly 300 as illustrated in FIG. 3 with the wheels oriented in a straight configuration. As can be seen, and as described previously, road wheel actuator 300 includes steer actuator 320 which is coupled to both right wheel 400 and left wheel 500. Right wheel 400 defines longitudinal axis 410 and left wheel 500 defines longitudinal axis 510. Road wheel actuator assembly 300 defines right wheel steering axis 303, which is off-set from longitudinal axis 410 of right wheel 400 by positive scrub radius $SR_p$. Similarly, road wheel actuator assembly 300 defines left wheel steering axis 305, which is also off-set from left wheel longitudinal axis 510 by positive scrub radius $SR_p$. It should be noted that whereas the schematic illustration for road wheel actuator assembly 300 includes a standard four bar linkage that is utilized on known steering systems for cars, where the wheels steer in unison based on a mechanical connection, such a four bar linkage is not required in the present invention. For example, use of an alternative steering system where each wheel is steered independently by the road wheel actuator assembly is contemplated and is included within the principles of the present invention.

Figure 7:
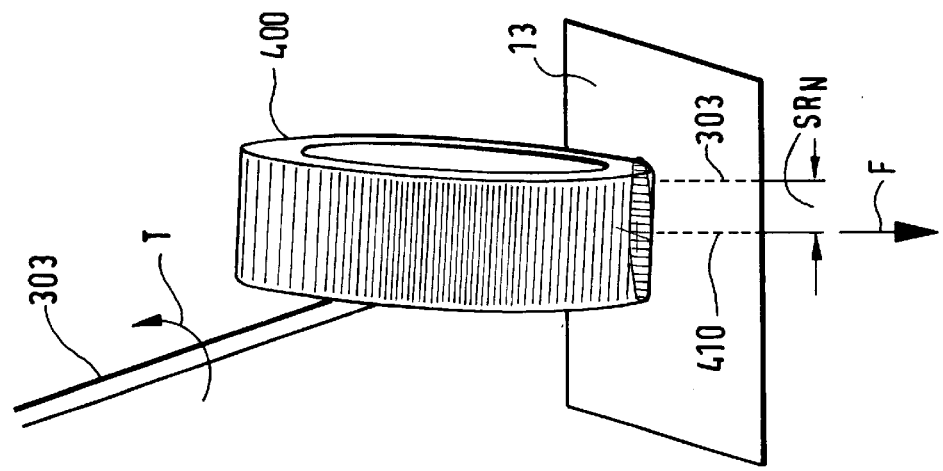
FIG. 7 is a schematic illustration of a steering axis as off-set from the longitudinal axis of the wheel by a negative scrub radius.
Figure 6:
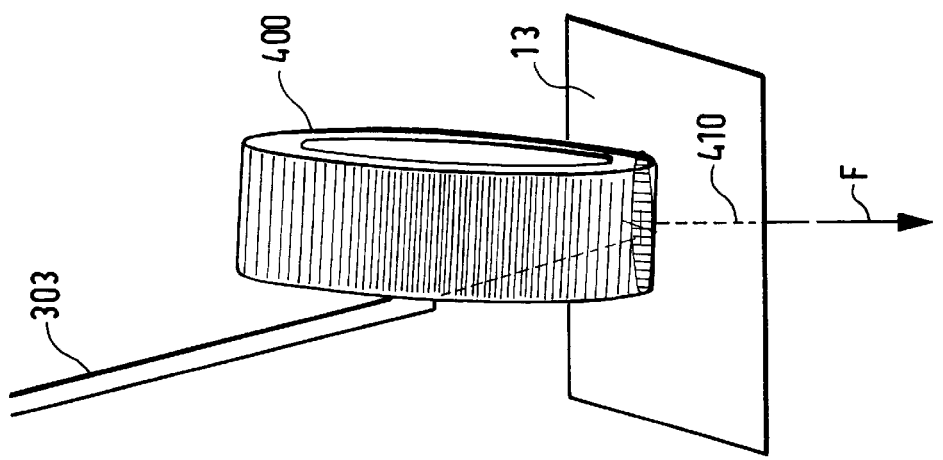
FIG. 6 is a schematic illustration of a steering axis with no scrub radius with respect to the longitudinal axis of the wheel.
Figure 5:
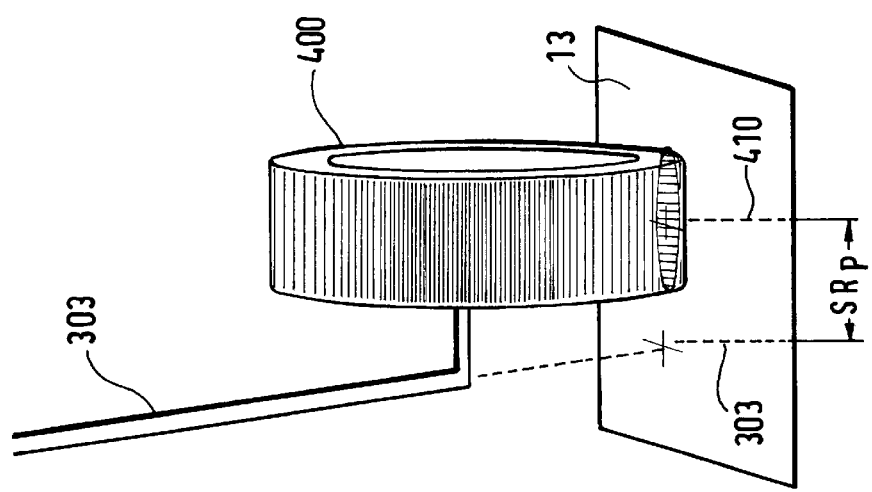
FIG. 5 is a schematic illustration of a steering axis as off-set from the longitudinal axis of the wheel by a positive scrub radius.
Figure 9:
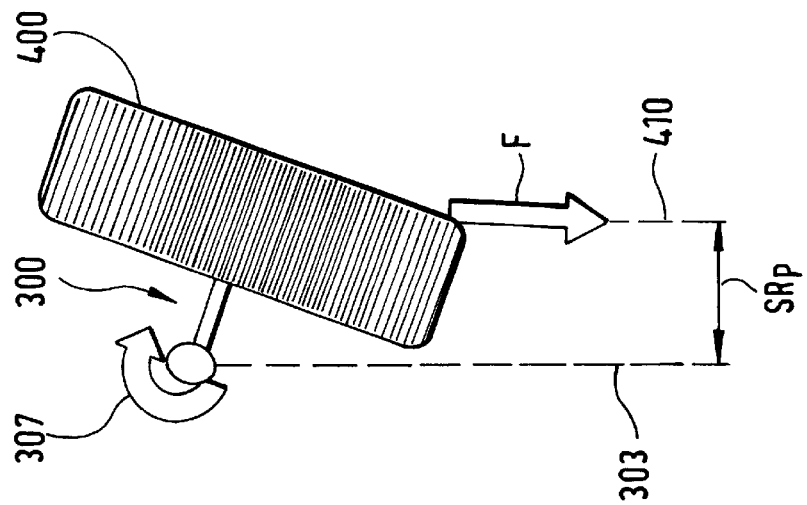
FIG. 9 is a top view schematic illustration of the steering axis and wheel of FIG. 8 with a resultant torque applied to the road wheel actuator assembly.
Figure 8:
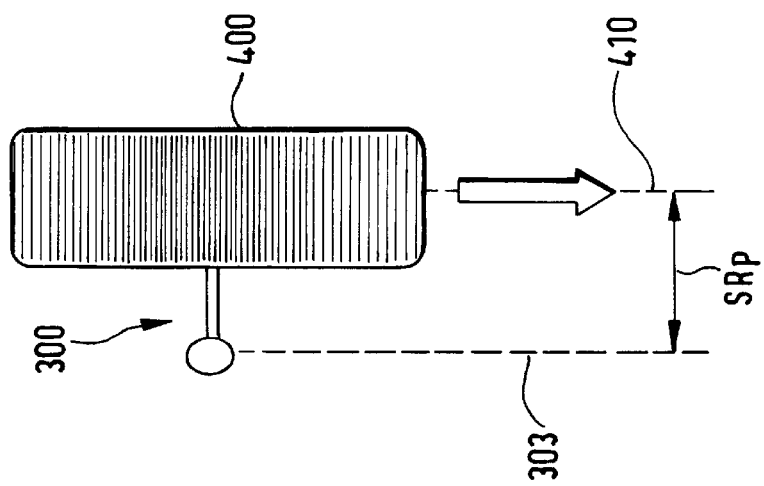
FIG. 8 is a top view schematic illustration of the steering axis with a positive scrub radius and a force as applied along the longitudinal axis of the wheel.
Figure 10:
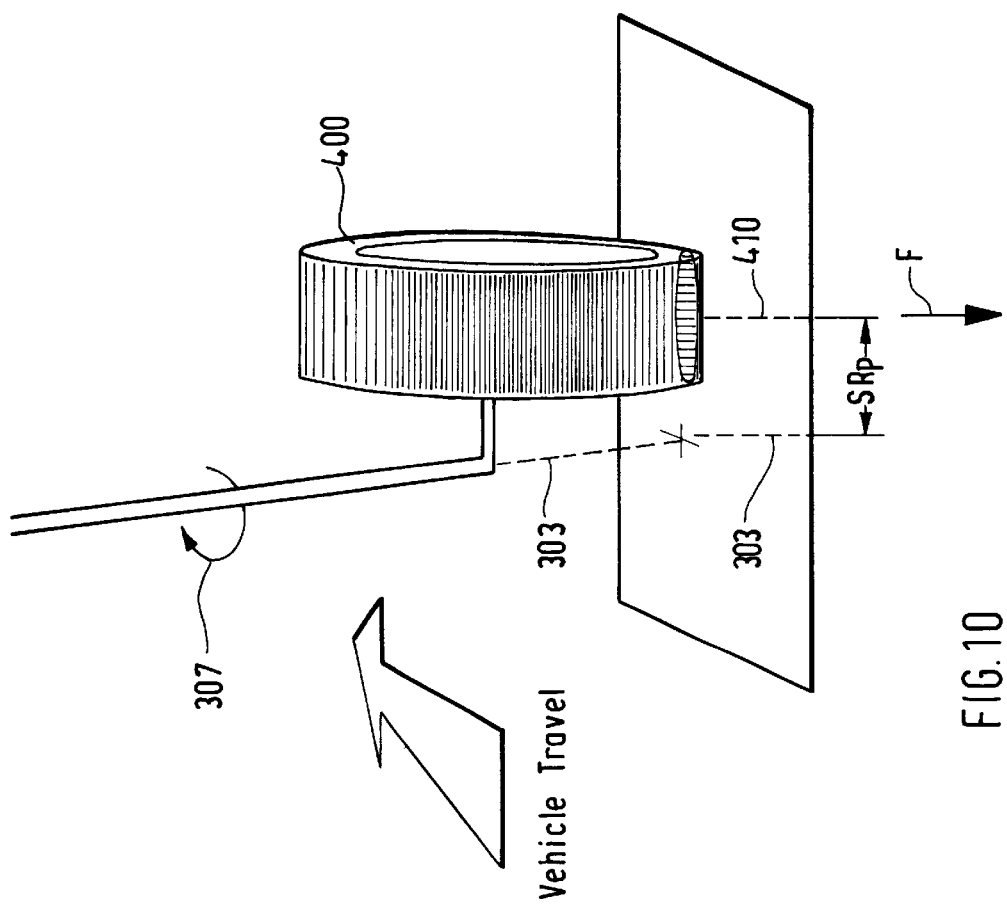
FIG. 10 is a rear view schematic illustration of the steering axis and wheel of FIG. 8 with a resultant torque applied to the road wheel actuator assembly.
Figure 11:
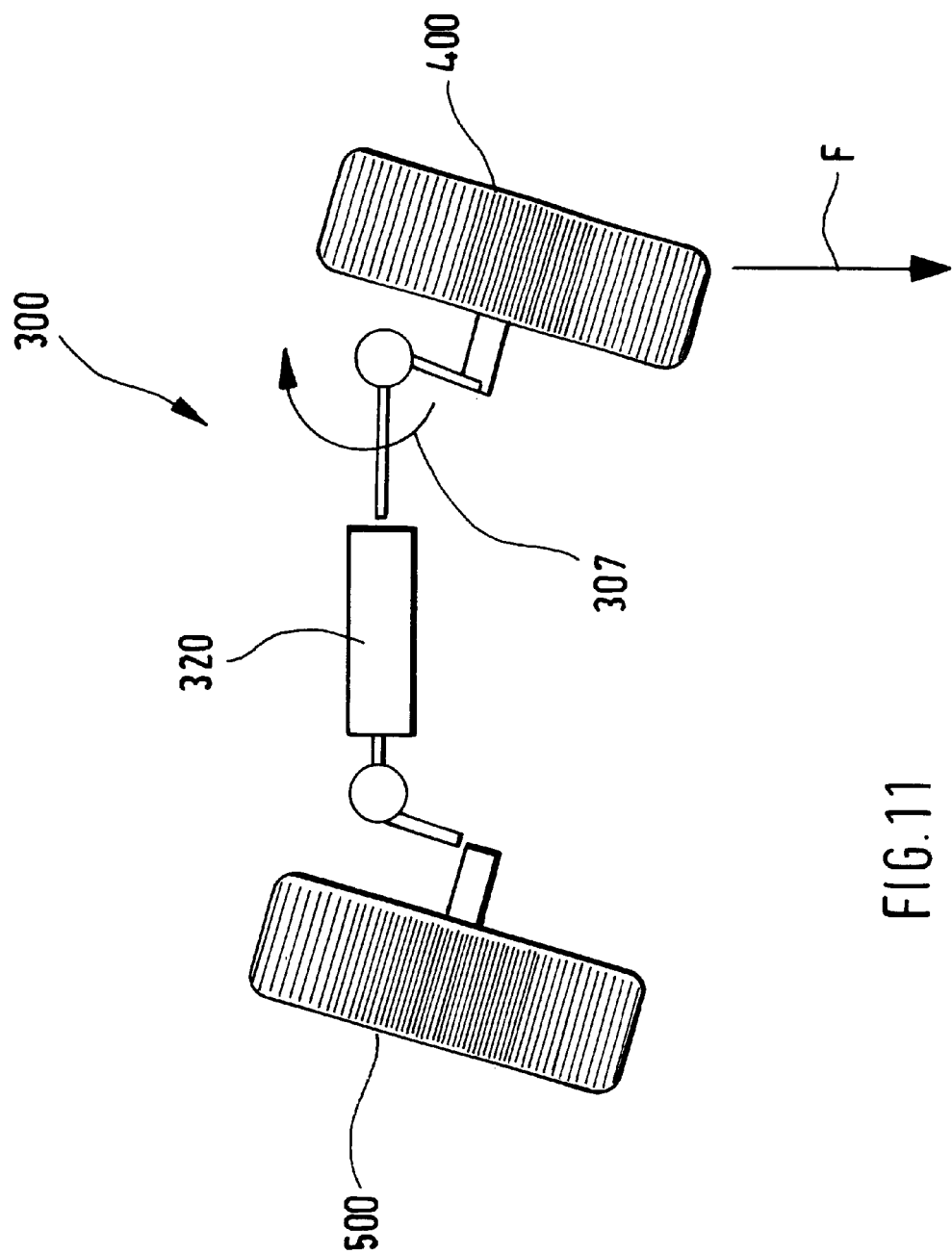
FIG. 11 is a top view of the road wheel actuator assembly of FIG. 3 with the wheels turned to the right as a result of a force applied along the longitudinal axis of the wheel as off-set from the steering axis by a positive scrub radius.

FIGS. 5–7 are provided for a further understanding of the definition of the scrub radius as used in the context of the present invention. FIG. 5 further illustrates the relationship between a steering axis of a vehicle and a longitudinal axis of a wheel which results in a positive scrub radius being defined between the steering axis and the longitudinal axis, as discussed previously. FIGS. 6 and 7 illustrate relationships between the steering axis of the vehicle and the longitudinal axis of a wheel where no scrub radius is defined and where a negative scrub radius is defined between the two axes, respectively. FIGS. 6 and 7 are provided merely to contrast the relationships between the steering axis and the longitudinal axis of the wheels illustrated in those Figures with that of the positive scrub radius as illustrated in FIG. 5.

Therefore, as discussed previously, FIG. 5 illustrates a right wheel 400 of a vehicle where the steering axis 303 is off-set from the longitudinal axis 410 of right wheel 400 by a positive scrub radius $SR_p$. FIG. 6 illustrates the relationship between the steering axis 303 and the longitudinal axis 410 of wheel 400 where no scrub radius is defined. As can be seen, steering axis 303 intersects road surface 13 on the longitudinal axis 410 of right wheel 400. Thus, steering axis 303 is not off-set from longitudinal axis 410. Therefore, as can be understood, a force F that is applied through longitudinal axis 410 of right wheel 400 would not act with a moment arm on steering axis 303. Thus, no torque would be applied to road wheel actuator assembly 300 as a result of force F being applied through longitudinal axis 410 of right wheel 400.

As discussed above, FIG. 7 illustrates a relationship between steering axis 303 and longitudinal axis 410 of wheel 400 where a negative scrub radius $SR_N$ is defined. As can be seen, steering axis 303 intersects road surface 13 at a point outboard of longitudinal axis 410 of right wheel 400. Thus, steering axis 303 is off-set from longitudinal axis 410 by a distance defined by the negative scrub radius $SR_N$. As can be understood, if force F is applied through longitudinal axis 410 of right wheel 400, a counter-clockwise torque T is applied to road wheel actuator assembly 300. This counter-clockwise torque tends to rotate right wheel 400 to the left. In the present invention, a negative scrub radius is not desired. When steering by brake to turn the right wheel to the right, the braking force, if acting on the road wheel actuator assembly through a negative scrub radius, applies a counter-clockwise torque on the right wheel, which turns the wheel to the left. This counter-clockwise torque, therefore, counteracts the steer-by-brake performance of the system.

In the present invention, as will be further described and illustrated in FIGS. 8–11, a braking force applied to, for example, the right wheel of the vehicle in order to turn the right wheel to the right, acts through a positive scrub radius to create a clockwise torque on the road wheel actuator assembly. This clockwise torque tends to rotate the right wheel to the right, which enhances the steer-by-brake performance of the back-drivable system of the present invention.

The effect of a braking force applied to a wheel of a vehicle through a positive scrub radius in accordance with the principles of the present invention is illustrated in connection with FIGS. 8–11. For illustrative purposes, the braking force and positive scrub radius are illustrated with respect to a right wheel of a vehicle. However, it can be understood that the same principles apply with respect to the vehicle's left wheel as well. As can be seen in FIGS. 8–11, and as described previously, right wheel 400 defines a longitudinal axis 410. Road wheel actuator assembly 300 defines a steering axis 303. Steering axis 303 is off-set from longitudinal axis 410 by a positive scrub radius $SR_p$ at a point where the steering axis 303 intersects the road surface upon which wheel 400 rests.

When a braking force F is applied through the longitudinal axis 410 of wheel 400, the force F acts through the lever arm defined by the positive scrub radius $SR_p$ to apply a clockwise torque 307 on the road wheel actuator assembly which acts to turn right wheel 400 to the right. The torque 307 applied to road wheel actuator assembly 300 moves steer actuator 320 which, in-turn, rotates wheel 400 to the right. Thus, in this failure mode of operation where the motor of the road wheel actuator assembly is inoperative, and thus is unable to move steer actuator 320, the braking force F applied to right wheel 400 acts through the positive scrub radius $SR_p$ to create a torque on the road wheel actuator assembly 300 in order to turn right wheel 400 to the right.

As described previously in this specification, whereas steer-by-brake systems can be used for steering the vehicle's wheels in a failure mode of a steer-by-wire system, the present invention, by incorporating a positive scrub radius with respect to the steering axis and the longitudinal axis of the wheel, augments the steer-by-brake performance. The positive scrub radius creates a torque on the road wheel actuator assembly to further assist in steering the vehicle through the braking system. Thus, through the present invention, less braking input is required at the individual wheels to achieve the same level of cornering performance that is available in a conventional steer-by-brake system. Additionally, a same braking force that is applied in a steer-by-brake system will apply a greater turning force on the wheels by incorporating the principles of the present invention.

An additional feature of the present invention improves the damping characteristics of the steer-by-wire system in a failure mode of operation. FIG. 12 is a block diagram of the road wheel actuator assembly that further illustrates the features of the present invention that are directed to the improved damping characteristics of the system.

A back-drivable steering system requires a variety of different system characteristics in order to be back-drivable. For example, a low level of friction is required between the components of the back-drivable system, the transmission gear in the system must be non-self-locking, and the system must be damped, i.e., the steering motion of the wheels must be slow and well-damped in order to prevent oscillations of the wheels so as to not excite the yaw dynamics of the vehicle. The present invention also includes features which improve the damping characteristics of the system in order to provide a well-damped system.

One method for improving the damping characteristics of the passive drive-back system of the present invention is to short the electric motor windings of the motor 310 of the road wheel actuator assembly 300. Shorting of the windings of motor 310 will damp the movement of the road wheel actuator assembly by using the electromotive forces of the shorted motor 310. In this method of improving the damping characteristics of the passive drive-back system, whereas the motor 310 is inoperative for moving steer actuator 320 to effect turning motion of the wheels, motor 310 retains some level of reduced functionality. For example, the power control electronics associated with the motor may fail such that the motor cannot be used to steer the vehicle, however, the physical components of the motor, e.g., the windings, are still intact and operable. So, the windings may still be shorted to provide a damping effect.

In an exemplary embodiment, the motor is a permanent magnet motor having a three-phase motor. When the windings of the motor are shorted together and the motor spins, the shorted windings cause a current to flow and the winding switch provides a torque on the road wheel actuator assembly. In this manner, if the motor is spun slowly, a low torque is provided. As the motor is spun faster, a higher current is created that, in-turn, creates more torque for damping.

To further control the damping characteristics of motor 310, as shown in FIG. 12, a resistive element 312 may be coupled in series with the shorted windings of motor 310. By putting a resistance in series with the shorted windings, the amount of current flow per revolution of the motor is essentially reduced, thus, changing the damping effect of the shorted windings of motor 310. The resistance provided by resistive element 312 may be adjusted, such that the damping force provided by motor 310 is variable. The resistive element 312 may be either an active or a passive element to adjust the damping characteristics of motor 310 through the back electromotive forces.

As is also illustrated in FIG. 12, a separate damping assembly 330 may be included within road wheel actuator assembly 300 in order to improve the damping characteristics of the back-drivable system of the present invention. Damping assembly 330 can include either an active damping device 332 or a passive damping device 334, and the present invention is not limited to any particular type of damping assembly 330 or damping device included within the damping assembly.

As described above, in accordance with the principles of the present invention, by incorporating a positive scrub radius into a back-drivable steering system, one can improve the steer-by-brake performance of the vehicle. The longitudinal forces, which act at the tires when braking, do not act directly through the steering axis of the axle, but rather act through the positive scrub radius. The longitudinal braking force, acting through the positive scrub radius, generates a torque on the steering system which improves the steer-by-brake performance of the vehicle.

Also in accordance with the principles of the present invention, the damping characteristics of the back-drivable steering system are improved. The improved damping of the system helps to ensure that any turning motions of the wheels are well-damped so as not to excite the yaw dynamics of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A back-drivable steer-by-wire steering system, comprising:
    a road wheel actuator assembly coupled to a vehicle wheel for effecting turning movement of the wheel wherein the road wheel actuator assembly defines a steering axis and wherein the steering axis is off-set from a longitudinal axis of the wheel by a positive scrub radius;
    wherein in a normal mode of operation, movement of the road wheel actuator assembly is effectuated by the steer-by-wire system;
    wherein in a failure mode of operation, the road wheel actuator assembly is back-drivable by a brake force applied to the wheel and acting through the positive scrub radius; and
    further wherein the road wheel actuator assembly includes a damping assembly.

2. The back-drivable steer-by-wire steering system of claim 1 wherein the road wheel actuator assembly includes a steer actuator and wherein the steer actuator is moved by the brake force applied to the wheel acting through the positive scrub radius to effect turning movement of the wheel.

3. The back-drivable steer-by-wire steering system of claim 1, wherein the damping assembly includes an active damping device.

4. The back-drivable steer-by-wire steering system of claim 1 wherein the damping assembly includes a passive damping device.

5. A back-drivable steer-by-wire steering system, comprising:
    a road wheel actuator assembly coupled to a vehicle wheel for effecting turning movement of the wheel wherein the road wheel actuator assembly defines a steering axis and wherein the steering axis is off-set from a longitudinal axis of the wheel by a positive scrub radius;
    wherein in a normal mode of operation, movement of the road wheel actuator assembly is effectuated by the steer-by-wire system;
    wherein in a failure mode of operation, the road wheel actuator assembly is back-drivable by a brake force applied to the wheel and acting through the positive scrub radius; and
    further wherein the road wheel actuator assembly includes an electric motor and wherein windings of the motor are shorted to damp a movement of the road wheel actuator assembly via back electro-motive forces.

6. The back-drivable steer-by-wire steering system of claim 5 wherein the road wheel actuator assembly further includes a resistive element coupled to the electric motor.

7. The back-drivable steer-by-wire steering system of claim 5 wherein the road wheel actuator assembly includes a steer actuator and wherein the steer actuator is moved by the brake force applied to the wheel acting through the positive scrub radius to effect turning movement of the wheel.

8. A method to steer a vehicle after failure of a road wheel actuator assembly in a back-drivable steer-by-wire steering system, the road wheel actuator assembly coupled to a vehicle wheel for effecting turning movement of the wheel and the road wheel actuator assembly defining a steering axis, the steering axis off-set from a longitudinal axis of the wheel by a positive scrub radius, comprising the acts of:
    applying a braking force to the wheel;
    generating a torque on the road wheel actuator assembly by the applied braking force, the applied braking force acting on the road wheel actuator assembly through a moment arm defined by the positive scrub radius;
    moving the road wheel actuator assembly in response to the torque;
    turning the vehicle wheel in response to moving the road wheel actuator assembly; and
    damping a movement of the road wheel actuator assembly.

9. The method of claim 8 wherein the act of damping the movement of the road wheel actuator assembly includes the act of shorting windings of an electric motor of the road wheel actuator assembly.

10. The method of claim 9 wherein the act of shorting windings of the electric motor of the road wheel actuator assembly includes the act of shorting the windings in series with a resistance.

11. The method of claim 10 wherein the resistance is adjustable to vary a level of damping provided by the electric motor.

12. The method of claim 8 wherein the act of damping a movement of the road wheel actuator assembly includes the act of actively damping the road wheel actuator.

13. The method of claim 8 wherein the act of damping a movement of the road wheel actuator assembly includes the act of passively damping the road wheel actuator assembly.

14. A method to steer a vehicle after failure of a road wheel actuator assembly in a back-drivable steer-by-wire steering system, the road wheel actuator assembly coupled to a vehicle wheel for effecting turning movement of the wheel and the road wheel actuator assembly defining a steering axis, the steering axis off-set from a longitudinal axis of the wheel by a positive scrub radius, comprising the acts of:

applying a braking force to the wheel;

turning the wheel a first degree in a direction in response to the applied braking force;

generating a torque on the road wheel actuator assembly by the applied braking force, the applied braking force acting on the road wheel actuator assembly through a moment arm defined by the positive scrub radius;

moving the road wheel actuator assembly in response to the torque; and turning the wheel a second degree in the direction in response to moving the road wheel actuator assembly, the second degree greater than the first degree.

15. The method of claim 14 further comprising the act of damping a movement of the road wheel actuator assembly.

16. The method of claim 15 wherein the act of damping the movement of the road wheel actuator assembly includes the act of shorting windings of an electric motor of the road wheel actuator assembly.

17. The method of claim 16 wherein the act of shorting windings of the electric motor of the road wheel actuator assembly includes the act of shorting the windings in series with a resistance.

18. An apparatus for steering a vehicle, comprising:

a back-drivable steer-by-wire system including a road wheel actuator assembly coupled to a wheel of the vehicle wherein the road wheel actuator assembly defines a steering axis and wherein the steering axis is off-set from a longitudinal axis of the wheel by a positive scrub radius;

wherein the road wheel actuator assembly includes a damping assembly.

19. The apparatus of claim 18 wherein the damping assembly includes an active damping device.

20. The apparatus of claim 18 wherein the damping assembly includes a passive damping device.

21. An apparatus for steering a vehicle, comprising:

a back-drivable steer-by-wire system including a road wheel actuator assembly coupled to a wheel of the vehicle wherein the road wheel actuator assembly defines a steering axis and wherein the steering axis is off-set from a longitudinal axis of the wheel by a positive scrub radius;

wherein the road wheel actuator assembly includes an electric motor and wherein windings of the motor are shorted to damp a movement of the road wheel actuator assembly via back electro-motive forces.

22. The apparatus of claim 21 wherein the road wheel actuator assembly further includes a resistive element coupled to the electric motor, the resistive element applying a variably adjustable resistance to the electric motor to adjust a level of damping provided by the electric motor.

23. A vehicle, comprising:

a vehicle body including a wheel; and a back-drivable steer-by-wire system including a road wheel actuator assembly coupled to the wheel wherein the road wheel actuator assembly defines a steering axis and wherein the steering axis is off-set from a longitudinal axis of the wheel by a positive scrub radius;

wherein the road wheel actuator assembly includes a damping assembly.

24. An apparatus for steering a vehicle, the vehicle having a back-drivable steer-by-wire steering system coupled to a wheel of the vehicle, comprising:

a road wheel actuator assembly defining a steering axis coupleable to the wheel in an operable configuration wherein, when in the operable configuration, the steering axis is off-set from a longitudinal axis of the wheel by a positive scrub radius;

wherein the road wheel actuator assembly includes a damping assembly.

* * * * *